(No Model.)
G. McKAY & W. L. TOBEY.
Nailing Machine.
No. 230,956.   Patented Aug. 10, 1880.
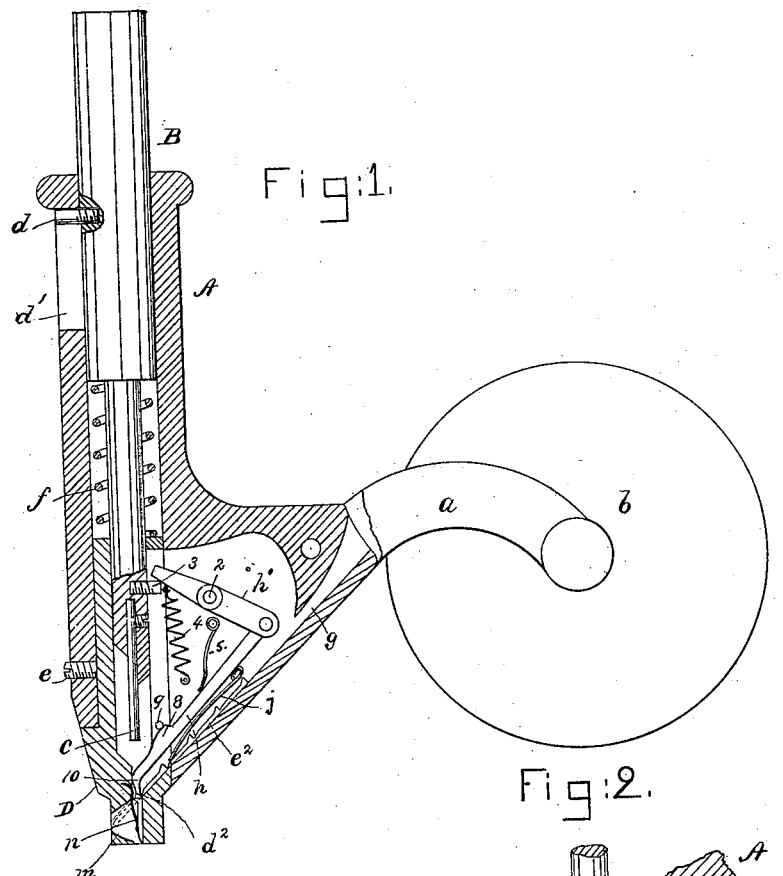
Fig:1.
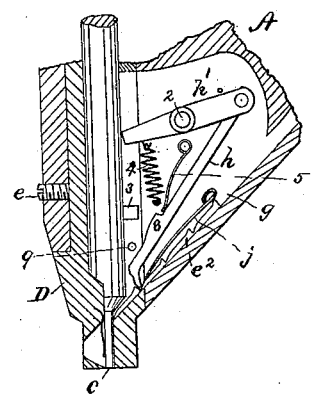
Fig:2.
Witnesses
V. D. Dearborn
L. F. Connor
Inventors.
Gordon McKay and Wm L. Tobey
by Crosby & Gregory Atty

UNITED STATES PATENT OFFICE.

GORDON McKAY, OF CAMBRIDGE, AND WILLIAM L. TOBEY, OF LAWRENCE, MASSACHUSETTS, ASSIGNORS TO GORDON McKAY, TRUSTEE.

NAILING-MACHINE.

SPECIFICATION forming part of Letters Patent No. 230,956, dated August 10, 1880.

Application filed June 7, 1880. (No model.)

*To all whom it may concern:*

Be it known that we, GORDON McKAY, of Cambridge, Middlesex county, and WILLIAM L. TOBEY, of Lawrence, Essex county, State of Massachusetts, have invented an Improvement in Nailing-Machines, (Case A,) of which the following description, in connection with the accompanying drawings, is a specification.

This invention relates to improvements in nailing-machines chiefly designed for boot and shoe work.

This our machine is of that class adapted to drive nails connected together head to point in a string, and denominated "string-nails," said string-nails being taken from a reel, and being cut off by the feeder as the driver ascends, the said nail being placed by the feeder in the path of the driver and there retained until the driver descends and strikes it.

The nail-string is fed forward at the proper time by a feeder moved forward positively by the driver as it ascends, and in the opposite direction by a suitable spring. The point of the nail next to be driven as the nail is moved forward across the path of the driver by the feeder is acted upon by a nail-controller, (shown as a spring,) that by its action upon the said nail near its point serves to bend it over or back into the nose-passage, placing it in a substantially vertical position in the path of the driver, and the feeder is so shaped, as hereinafter described, as to sever the said nail from the string and hold it for the action of the driver.

Figure 1 represents, in vertical section, a nail-driving machine containing our invention, the different parts being in the position they will occupy when the driver-bar is almost elevated, the feeder being about to cut the nail in advance of it from the string of nails, the reel connected with the machine to hold the nail-strip being in elevation, and Fig. 2 is a detail, also in section, showing the devices in the position they will occupy when the driver-bar is depressed.

The frame A, preferably of metal, shaped to be easily grasped by hand, has ears $a$, to hold a reel, $b$, of usual construction, upon which, between its heads, will be placed the usual string-nails to be employed. The said frame has an opening to receive the driver-bar B, having at its lower end the driver $c$. A pin, $d$, of the driver-bar enters a slot, $d'$, of the frame to prevent rotation of the said bar.

At the lower end of the frame, and held therein by the screw $e$, is the nose-piece D, one corner, $d^2$, of which is sufficiently hard to serve as one member of the cutter. The lower end of the driver-bar rests in a passage made at the upper part of this nose-piece, and between the nose-piece and a shoulder on the driver-bar is placed a spiral spring, $f$, that lifts the driver-bar and driver after they have been driven or forced down in any usual way.

The string-nails $e^2$ rest upon the guiding-surface $g$ of the frame, and their heads are acted upon to feed the nail-string forward automatically by means of the feeder $h$, it being made as a pawl jointed to a lever, $h'$, pivoted at 2, and acted on as the driver rises to move the feeder and nail-string forward by means of a pin or projection, 3, of the driver-bar, a spring, 4, throwing the free end of the lever $h'$ down and withdrawing the feeder.

A spring, 5, holds the feeder $h$ down on the nail-string, and a spring, $j$, prevents retrograde motion of the nail-string. The pawl or feeder has at its upper side an incline, 8, that acts upon the pin 9 as the feeder completes its forward stroke, causing its forward downwardly-inclined end 10 to descend sufficiently to pinch the nail between the said end 10 and the corner $d^2$, and cut from the string the nail next to be driven, the nail-controller $n$ serving to hold it in place until the driver in its descent strikes the nail.

The nose D has within it and at one side of the driver-passage a recess, $m$, to receive the nail-controller $n$, made as a spring.

As the nail is fed forward from the surface $g$ its point meets the nail-controller and forces it backward, substantially as shown in dotted lines; but as the feeder arrives substantially at the position Fig. 1, with the nail-head pushed just off the said surface $g$, the nail-controller acts to turn the nail down into the position shown in full lines, Fig. 1, and the end 10 of the feeder and the part $d^2$ cut off the nail, leaving it in the driver-passage of the nose ready to be struck by the driver as the driver-bar is made to descend.

As the driver-bar descends the spring 4 retracts the feeder in advance of the end of the driver, and the latter strikes the head of the nail and drives it, the driver descending substantially into the position, Fig. 2. As soon as the driver-bar is released from downward pressure the spring $f$ elevates it and the driver, causing the feeder, which, it will be seen, is also a cutter, to feed forward the nail-string, placing another nail in position to be driven. By feeding the nail-string and cutting it off when the driver-bar is being elevated the entire force of the driver is expended in driving.

Instead of providing the feeder with a projection, 8, to meet the pin 9, it is obvious that the feeder may have an irregular slot made in it to receive a pin, or may have its forward end depressed at the end of its forward stroke to cause the end 10 to cut off the nail, as described, without departing from this invention.

We are aware that it is not new to move forward a peg-strip through the instrumentality of a lever and pawl, the lever being acted upon by the driver in its descent, the said driver also carrying an independent chisel-like cutter to sever a peg from the peg-strip.

We claim—

1. In a nailing-machine, the driver, combined with and actuating the feeder to feed and cut from the string of nails, at the upward movement of the driver, the nail to be driven at the next descent of the driver, substantially as described.

2. In a nailing-machine for driving string-nails, a feeder to engage the heads of the string-nails and feed them forward, combined with a nail-controller located in a recess, $m$, to act upon and bend the nail to be driven back into the path of the driver, substantially as described.

3. In a nailing-machine, the nail-driver bar and the feeder provided with the projection 8, combined with the pin 9, against which the said incline acts as the feeder is moved forward by the driver, as and for the purpose set forth.

4. In a nailing-machine, the driver-bar, combined with the feeder, which is also a cutter, the feeder being made as described, and combined with a pin or projection to depress the forward end of the feeder to cut the nail as the feeder reaches its forward position, substantially as described.

In testimony whereof we have signed our names to this specification in the presence of two subscribing witnesses.

GORDON McKAY.
WM. L. TOBEY.

Witnesses:
GEO. W. GREGORY,
L. F. CONNOR.